March 5, 1929.  A. R. McCLELLAND  1,704,333
BERMUDA GRASS CUTTER
Filed June 13, 1928
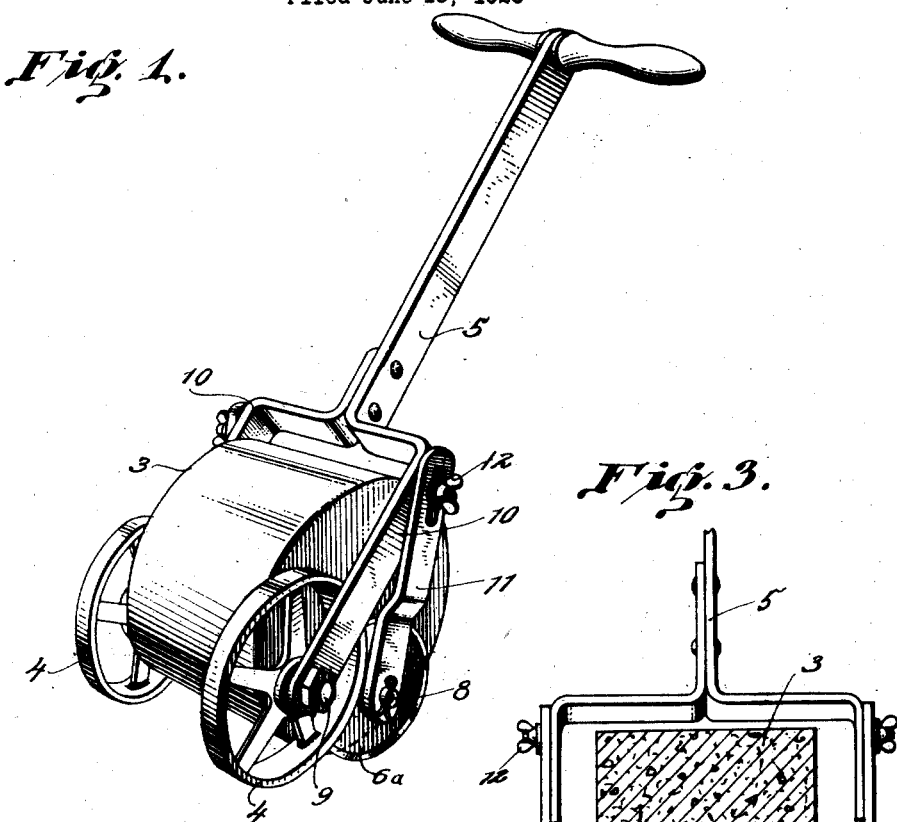
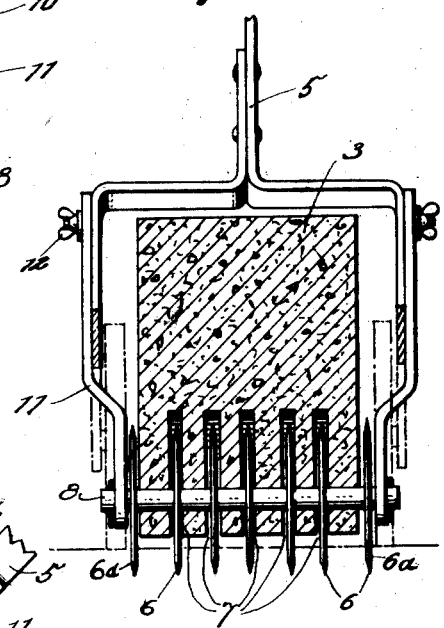
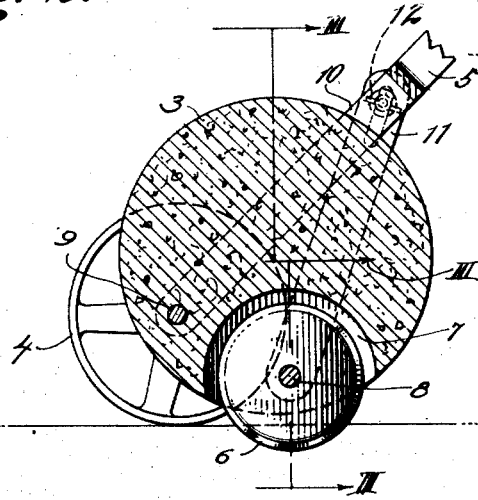
INVENTOR
Alva R. McClelland
BY Nestall and Wallace
ATTORNEYS Patented Mar. 5, 1929.

1,704,333

UNITED STATES PATENT OFFICE.

ALVA R. McCLELLAND, OF LA MANDA PARK, CALIFORNIA.

BERMUDA-GRASS CUTTER.

Application filed June 13, 1928. Serial No. 284,918.

This invention relates to a device for severing into lengths Bermuda grass or vegetation of a like character. Bermuda grass has runners which spread over the surface of the ground, taking root at the joints and sending out shoots which bear seed. The runners will eventually extend to comparatively great length, interlace with one another and form a Bermuda mat which chokes the growth of desirable grass in lawns. Due to the various rooted sections of the runner, it requires great force to pull the growth from the soil, and such pulling disturbs and damages the root growth of the desirable grass. Various devices have been provided to rake and pull and cut the grass at one operation. These are difficult of operation and unsatisfactory. The present invention has for its primary object the provision of a device which severs the Bermuda grass into comparatively short lengths, making it easily removable by raking. Another object of this invention is to provide a device adaptable for cultivating lawns, that is, to open the lawn and provide a seed bed. In addition to the broader objects of this invention, there are certain details of structure whereby a device having rotary cutters weighted to penetrate and cut the Bermuda mat and open the lawn is obtained. A still further object is to provide a device which is simple, durable and economical in construction and easily manipulated.

These objects together with other objects and corresponding accomplishments are obtained by means of the embodiment of my invention illustrated in the accompanying drawing, in which:—

Fig. 1 is a perspective view of a cutter; and Fig. 2 is a transverse section therethrough; and Fig. 3 is a section on line III—III of Fig. 2, the cutter disks being in elevation.

Referring more particularly to the drawing, the cutter comprises a body 3, ground wheels 4 mounted thereon and a handle 5 for guiding the cutter and in the structure disclosed herein for propelling the same. The cutter disks are indicated by 6. Although the device shown herein is adaptable for manual propulsion, it will be understood that self propelling means may be added.

The body as shown herein is cylindrical in form and serves as a weight to cause the cutter disks to penetrate the ground. In the periphery thereof are spaced slots 7 to accommodate the cutter disks 6. In practise the slots are preferably approximately one and one half inches apart as in operation upon Bermuda grass, it is found advantageous to separate the runners into lengths of about one and one half inches. Extending through the body and bridging the slots is a shaft 8, which is preferably removable endwise of the body. Journalled upon the shaft and accommodated in the slots are the cutter disks 6 and at the outer sides of the body, disks 6$^a$ are journalled on the shaft. Extending through the body and off center from the gravitative axis thereof is a shaft 9 providing spindles at its ends upon which are journalled the ground wheels 4.

The guide handle 5 has a yoke comprising arms 10 which embrace the sides of the body and are connected to the shaft 9. Mounted upon the shaft 9 are braces 11 having elongated slots at the other ends, through which extend bolts upon which are mounted wing nuts 12 for clamping the braces to the yoke arms.

In the operation of the device, the braces 11 are adjusted in their connection to the yoke so as to elevate the handle of the device to a height suitable for the operator. With the ground wheels 4 supported upon the surface of the ground, and the body 3 a slight distance above, the disks will penetrate the growth on the surface of the ground as best shown in Fig. 2. It will be noted that the weight has its center in vertical alinement with the shaft of the cutter disks, thereby most effectively transmitting the weight of the body to the disks. The cutter in the position shown in Fig. 2 is pushed and pulled over the surface of the mat to be cut. Obviously the cutter should be moved crossways to obtain a checkboard severance of the growth. In order to move the cutter from place to place, the handle is swung so as to elevate the cutter disks, the handle being then in the reverse position to that shown in the drawing. In this position the cutter may be moved without the disks engaging the surface.

Various mechanical changes may be made without departing from my invention which is defined in the appended claims.

What I claim is:—

1. In a device of the character described, the combination of spaced ground wheels, a weight body supported between said wheels, spaced cutter disks journalled on and supported from said body so as to project from the periphery thereof, and a guide handle secured to said body.

2. In a device of the character described, the combination of a weight body, spindles extending from the sides of said body, ground wheels mounted on said spindles, spaced cutter disks journalled on and supported from said body so as to project from the periphery thereof, and a guide handle secured to said body.

3. In a device of the character described, the combination of a weight body, spindles extending from the sides of said body and disposed on an axis off the gravitative axis of said body, ground wheels mounted on said spindles, spaced cutter disks journaled on and supported from said body so as to project from the periphery thereof, and a guide handle secured to said body.

4. In a device of the character described, the combination of a weight body, spindles extending from the sides thereof, ground wheels mounted on said spindles, slots in the periphery of said body, cutter disks disposed in said slots so as to project from said body and journalled therein, and a guide handle secured to said body.

5. In a device of the character described, the combination of a weight body, spindles extending from the sides thereof on an axis off the gravitative axis of said body, ground wheels mounted on said spindles, spaced cutter disks journalled on and supported from said body so as to project from its periphery, a guide handle having a yoke embracing said body and secured to said spindles, and braces connected to the body at the axis of said disk and to said yoke.

6. In a device of the character described, the combination of a weight body, spindles extending from the sides thereof on an axis off the gravitative axis of said body, ground wheels on said spindles, a shaft mounted on said body, spaced cutter disks journalled on said shaft so as to project from the periphery of said body, a guide handle having a yoke embracing said body and secured to said spindles, braces secured to said shaft, and adjustable means securing said braces to the arms of said yoke.

7. In a device of the character described, the combination of a weight body, spindles extending from the sides thereof on an axis off the gravitative axis of said body, spaced slots in the periphery of said body, a shaft extending through said body, cutter disks disposed in said body and journalled on said shaft so as to project from said body, a guide handle having a yoke embracing said body and secured to said spindles, and braces secured to said shaft and to the arms of said yoke.

8. In a device of the character described, the combination of a weight body, spindles extending from the sides thereof on an axis off the gravitative axis of said body, spaced slots in the periphery of said body, a shaft extending through said body and bridging said slots, cutter disks journalled on said shaft so as to project from the periphery of said body, a guide handle having a yoke embracing said body and secured to said spindles, and braces secured to said shaft and to the arms of said yoke.

9. In a device of the character described, the combination of a weight body, spindles extending from the sides thereof on an axis off the gravitative axis of said body, spaced slots in the periphery of said body, a shaft in said body bridging said slots, cutter disks journalled on said shaft so as to project from the periphery of said body, a guide handle having a yoke embracing said body and secured to said spindles, braces secured to said shaft, and adjustment means securing said braces to the arms of said yoke.

In witness that I claim the foregoing I have hereunto subscribed my name this 6th day of June, 1928.

ALVA R. McCLELLAND